Nov. 22, 1927.
L. NIXON
1,650,377
DIAPHRAGM PUMP
Filed July 1, 1926
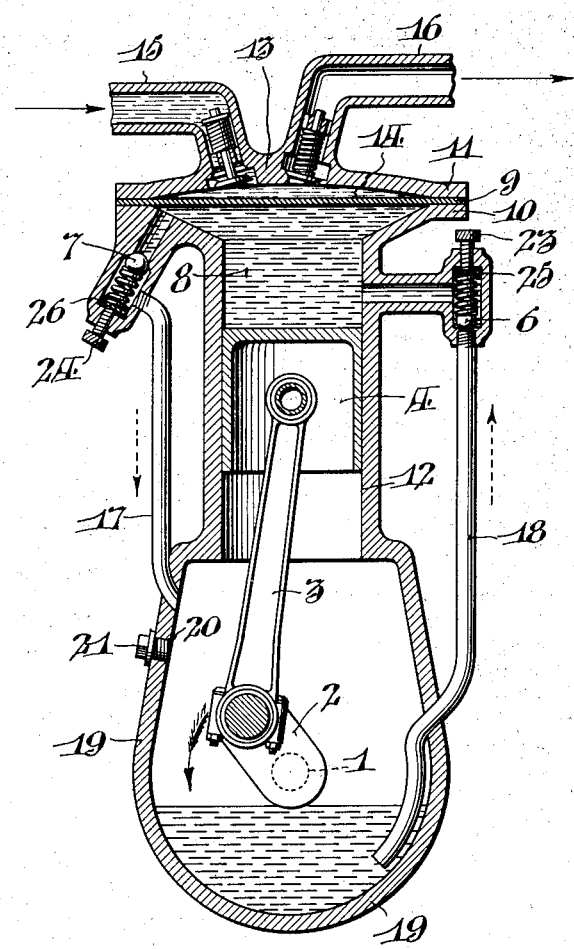
WITNESSES:
INVENTOR:
Leroy Nixon,
BY
ATTORNEYS.

Patented Nov. 22, 1927.

1,650,377

UNITED STATES PATENT OFFICE.

LEROY NIXON, OF EASTON, PENNSYLVANIA.

DIAPHRAGM PUMP.

Application filed July 1, 1926. Serial No. 119,792.

My invention relates to that type of pump which is commonly known as a diaphragm pump and which is particularly useful where intermittent pumping action is desirable in the transmission of fluids either in liquid or gaseous form. More especially my novel pump is designed and adapted for the compression of gas used in refrigerating apparatus, but it will be obvious from the detailed description herein that the principle embodied may be employed for numerous other purposes. A decided advantage of the diaphragm pump over the common reciprocating type lies in the fact that the element actuating the diaphragm is absolutely isolated from the fluid lines so that said element is free from contamination, there being no contact between the fluid being pumped and the working parts of the pump. In the chamber on the piston side of the diaphragm I preferably employ a non-compressible fluid as the actuating medium, so that pressure is exerted uniformly over the area of the diaphragm. While it is readily apparent that either gas, air or other fluid could be used for this purpose, I will refer to the actuating medium as oil for the sake of brevity.

The principal object of my invention is to provide a diaphragm pump in which a portion of the fluid actuating the diaphragm is continually maintained in circulation between the piston chamber and an auxiliary source of supply (in the present instance the crank case) thus offsetting any leakage which might occur around the piston and at the same time cooling the diaphragm by reason of constant replenishment of the oil.

The accompanying drawing shows a vertical sectional view of a pump conveniently embodying my invention.

Power is suppled from any desirable outside source to the crank shaft 1, which, by means of the crank arm 2 and piston rod 3, imparts reciprocating motion to the piston 4 within the cylinder 12. Spring influenced ball valves shown at 6 and 7, respectively control admission and discharge of oil to and from the piston chamber 8 synchronously with downward and upward movement of the piston 4. A flexible diaphragm 9 is firmly secured at its outer edge between the respective flanges 10 and 11 of the cylinder wall 12 and the cylinder head 13, thus dividing the cylinder into a piston chamber 8 and a pumping chamber 14. Integral with the cylinder head 13 are the intake and exhaust ports 15, 16 which control transmission of the fluid being pumped in the direction indicated by the arrows in the illustration. Between the ball valve 7 and the crank case 19, a conduit having the form of a pipe 17 is employed to conduct the oil or actuating medium from the piston chamber 8 to the reservoir in the crank case. A similar pipe 18 at the opposite side of the pump serves to conduct oil from the reservoir to the valve 6 from whence it is admitted to the top of the piston 4. Oil is introduced into the crank case through the opening 20 which is fitted with a removable closure plug 21. In the construction shown, the piston chamber 8 is—at all times—maintained full of oil, since on the up-stroke of the piston 4, the quantity of oil displaced over and above a volume corresponding to the capacity of the chamber 14, is by-passed through the valve 7 and returned to the crank case. On the down stroke the corresponding vacuity created in chamber 8 is compensated for by the influx of the oil through the valve 6.

In order to enable fine adjustment of the oil admission and discharge valves 6, 7, I employ set screws 23 and 24 which cooperate with discs 25 and 26 in regulating spring compression.

The operation of my novel diaphragm pump is as follows:

Let it be assumed that the piston 4 has just begun its descent. As the rotation of the crank arm 2 continues in the direction indicated, the downward movement of the piston 4 creates a partial vacuum in the piston chamber 8, causing the diaphragm 9 to be drawn towards the piston and creating a similar vacuum in the pumping chamber 14. In responding to suction, the intake valve 15 immediately opens thereby to allow influx of the fluid being pumped to the upper chamber 14. In practice, the oil inlet valve 6 is set to yield at a pressure considerably higher than the valve 15 so that the former remains closed until the piston 4 has nearly reached the downward limit of its stroke. With further descent of the piston 4, the spring pressure of the oil inlet valve 6 is ultimately overcome thereby allowing oil from the crank case 19 to enter the piston chamber 8 by way of the pipe 18 throughout the remainder of the stroke. During the up stroke of the piston 4, the diaphragm 9 is upwardly displaced through pressure induced by the oil in the piston chamber 8 thus causing expulsion of the fluid being pumped through the outlet valve 16. As the pressure exerted on the oil increases with contact of the diaphragm 9 with the cylinder head 13, the discharge valve 7, is forced open, thereby releasing the excess charge of oil in the piston chamber 8 through the pipe 17 back to the crank case 19 and completing the cycle of operation. In this way I not only insure that the chamber 8 is at all times filled with oil, but also compensate for leakage past the piston 4. Furthermore, circulation of the oil in the manner described, serves to keep the operating parts of the pump cool, all to the end of maintaining the maximum efficiency in pump operation.
It is readily apparent that my diaphragm pump can be utilized for a variety of purposes and that the elements employed in the separate chambers thereof may vary according to the use adopted. Therefore I do not confine myself to the use of any particular materials in the construction of my diaphragm pump.

Having thus described my invention, I claim:

1. In a pump of the character described, a cylinder having an aligned crank-case functional as a fluid actuant reservoir and its opposed end dished, an oppositely dished head, a flexible diaphragm interposed between the cylinder dished end and head to set apart a piston chamber and a co-axial pumping chamber, a reciprocatory piston in said cylinder to vibrate the diaphragm through the medium of the fluid actuant, said piston having a displacement in excess of the capacity of the pumping chamber, and fluid control means whereby a corresponding excess of the fluid actuant is continually maintained in circulation between the piston chamber and the fluid reservoir to offset any leakage around the piston while simultaneously cooling the diaphragm by constant replenishment of the actuant.

2. In a pump of the character described, a cylinder having an aligned crank-case functional as a fluid actuant reservoir and its opposed end dished, an oppositely dished head, a flexible diaphragm intervening the cylinder dished end and head to set apart a piston chamber and a co-axial pumping chamber, a reciprocatory piston in said cylinder to vibrate the diaphragm through the medium of the fluid actuant, said piston having a displacement in excess of the capacity of the pumping chamber, and inlet and outlet valve-controlled conduits connecting the lower and upper ends of the piston chamber with the reservoir aforesaid whereby a corresponding excess of the fluid actuant is constantly maintained in circulation to offset leakage around the piston and to simultaneously cool the diaphragm.

3. In a pump of the character described, a cylinder having an aligned crank-case functional as a fluid actuant reservoir and its opposed end dished, an oppositely dished head, a flexible diaphragm intervening the cylinder dished end and head to set apart a piston chamber and a co-axial pumping chamber, a reciprocatory piston in said cylinder to vibrate the diaphragm through the medium of the fluid actuant, said piston having a displacement in excess of the capacity of the pumping chamber, adjustable valves controlling inlet and outlet conduits connecting the lower and upper ends of the piston chamber with the reservoir aforesaid, and valves controlling admission as well as discharge of the fluid being pumped by the diaphragm, said last mentioned valves being set for operation at lower pressures than the first mentioned valves, for the purpose specified.

In testimony whereof, I have hereunto signed my name at Easton, Pennsylvania, this 25 day of June, 1926.

LEROY NIXON.